United States Patent [19]

De Blok et al.

[11] Patent Number: 4,645,923
[45] Date of Patent: Feb. 24, 1987

[54] METHOD AND DEVICE FOR COUPLING AN OPTICAL SIGNAL FROM A FIRST LIGHT GUIDE INTO A SECOND LIGHT GUIDE

[75] Inventors: Cornelis M. De Blok, Ak Zoeterwoude; Pieter Matthijsse, Ab Bergschenhoek, both of Netherlands

[73] Assignee: Staat der Nederlanden (Staatsbedrijf der Posterijen, Telegrafte en Telefonie), The Hague, Netherlands

[21] Appl. No.: 658,297

[22] Filed: Oct. 5, 1984

[30] Foreign Application Priority Data

Oct. 6, 1983 [NL] Netherlands .................. 8303432

[51] Int. Cl.[4] ............................ H01J 5/16; G02B 6/26
[52] U.S. Cl. ............................. 250/227; 350/96.15
[58] Field of Search ............... 250/227; 350/96.15, 350/96.3

[56] References Cited

U.S. PATENT DOCUMENTS

| 4,342,907 | 8/1982 | Macedo et al. | 250/227 |
| 4,351,585 | 9/1982 | Winzer et al. | 250/227 |
| 4,471,219 | 9/1984 | Giallorenzi | 250/227 |

FOREIGN PATENT DOCUMENTS

| 2064503 | 7/1972 | Fed. Rep. of Germany | 350/96.15 |
| 0151455 | 11/1979 | Japan | 350/96.15 |
| 8201741 | 12/1982 | Netherlands | |
| 1420458 | 1/1976 | United Kingdom | 350/96.15 |
| 2100463 | 12/1982 | United Kingdom | |

Primary Examiner—David C. Nelms
Assistant Examiner—Michael Messinger
Attorney, Agent, or Firm—Frishauf, Holtz, Goodman & Woodward

[57] ABSTRACT

An apparatus for aligning monomode optical fibers utilizes a first optical coupler for injecting light into a straight section of a first fiber through its buffer, a first pin for bending the first fiber downstream of the first optical coupler to convert cladding modes into core modes, a second pin for converting core modes into cladding modes in a second optical fiber, a second optical coupler for withdrawing light from the second optical fiber through its buffer, and feedback control to optimize the amount of light transferred from the first fiber core to the second fiber core.

18 Claims, 4 Drawing Figures

METHOD AND DEVICE FOR COUPLING AN OPTICAL SIGNAL FROM A FIRST LIGHT GUIDE INTO A SECOND LIGHT GUIDE

BACKGROUND OF THE INVENTION

The invention concerns a method and apparatus for introducing an optical signal from a first light conductor or first optical fiber, into a second light conductor or second optical fiber, whereby the optical signal is radiated through a buffer into the cladding and the core of the first optical fiber and the optical signal from the second optical fiber is detected through the buffer, and wherein the ends of the optical fibers are arranged relative to each other in such manner that the greatest possible part of the optical signal is passed from the end of the first optical fiber into the end of the second optical fiber. Such an arrangement is necessary before the ends of the optical fibers are interconnected by welding or bonding.

An optical fiber can generally be described as including a core of high-grade translucent material such as doped quartz, around which is formed a translucent cladding material, such as quartz, preferably having a refractive index lower than that of the core. The cladding is in turn surrounded by a buffer usually consisting of a polymeric material. The refractive index of the buffer can be higher than, lower than, or equal to that of the cladding.

Optical fibers currently used for data transmission can be divided into two main groups, these groups being (1) multimode optical fibers, and (2) monomode optical fibers.

A multimode optical fiber generally has a core having a diameter in the order of magnitude of 50 $\mu$m and a cladding diameter in the order of 125 $\mu$m. In order to keep the ratio between the cladding diameter and the core diameter low, the core is arranged substantially concentrically within the jacket so that no great problem arises in aligning two optical fiber ends with one another. The monomode optical fibers presently in use comprise a core having a diameter in the order of magnitude of 8 $\mu$m and a cladding diameter of approximately 125 $\mu$m. Since the core diameter is small in relation to the cladding diameter, the core often does not lie quite concentrically within the cladding. This results in alignment problems, since the amount of light in the core of a monomode filament is less than that in a multimode fiber when the same light source is used.

In order to reduce as much as possible the attenuation that occurs at a weld or bond between the two ends of monomode fibers, it is necessary to align the cores of the fibers very accurately with each other. The alignment is preferably achieved by passing an optical signal into the core of the first fiber and by passing the light emerging from the end of the first fiber into the end of the second fiber so that maximum transfer of the optical signal is achieved. In this connection it is necessary that the optical signal be located principally in the core and that the amount of light in the cladding be minimized, since otherwise precise alignment of the cores does not occur.

European Patent No. EP30-106 discloses a method of aligning two monomode fibers with each other. An optical signal is introduced at a first end of the first fiber, whereafter a second end of the first fiber is so positioned in relation to a first end of the second fiber that maximum transfer of signal occurs. Detection of the signal in the second fiber is carried out by detecting the light in the cladding.

The method in accordance with this proposal is disadvantageous since the radiation or propagation of the signal in the first fiber occurs through the length of the fiber over a great distance. The proposed out-coupling method is successful only in the case of fibers having a buffer with a refractive index that is lower than that of the cladding.

Netherlands Patent Application No. NL-A-8201741 discloses a method and apparatus which render it possible to radiate an optical signal at a short distance from the coupling point. In this apparatus, however, no steps are taken to ensure that the signal in the core is as great as possible and that the signal in the cladding is as small as possible. Although the proposed method is quite suitable for alignment of fiber claddings which is sufficient when multimode fibers are being spliced, this method is not suitable when monomode fibers are being spliced since alignment of the claddings does not ensure that the monomode cores will be aligned.

SUMMARY OF THE INVENTION

An object of the invention is to provide a method and apparatus which do not suffer from the above-mentioned drawbacks and which render it possible to align the ends of the cores of two monomode optical fibers accurately.

The invention includes novel means and methods for injecting light into a fiber, novel means and methods for withdrawing light out of a fiber and novel means and methods for aligning fibers utilizing these injecting and withdrawing means. One method of the invention is characterized by the following steps:

a. injecting an optical signal onto a straight portion of the first optical fiber at an angle of at least 10° and at most 20° relative to a longitudinal axis of the first optical fiber by using an optical coupler having a refractive index lower than that of the buffer;

b. applying a mirror surface to the buffer of the first optical fiber over a portion thereof which lies opposite a light injection surface and is in a straight line with the axis of the direction of light being injected;

c. converting cladding modes of the optical signal into modes conducted through the core by bending the first optical fiber through an angle of at least 45° and at most 180° with a radius of at least 3 mm and at most 10 mm at a distance of at most 10 mm from the light injection surface;

d. aligning the cores of the first and the second optical fibers relative to each other;

e. withdrawing the optical signal from the core of the second optical fiber by using a second optical coupler having a refractive index higher than that of the buffer of the second optical fiber.

If the optical fiber has a buffer which has a refractive index that is lower than that of the cladding, an optical coupler having a higher refractive index than that of the cladding is applied to the fiber cladding after removing a portion of the buffer at a location just in front of the fiber end being aligned, so as to withdraw any remnants of the optical signal that may be present in the cladding.

An optical coupler usable with the apparatus of the invention comprises a light conductor 11, possibly but not necessarily another optical fiber, which has a diameter that is not greater than that of the first optical fiber 1 and an optical refractive index which is lower than that of the buffer 2 of the first optical fiber, and means 15, 18 for holding each of the first and second optical fibers in a bent position and as free from contact with each other as possible. The invention allows very good alignment of monomode fibers in an unexpected manner since an optical signal is introduced into and withdrawn from straight sections of first and second fibers at a short distance from a joint that is to be formed between the fibers. The joint can be either a fusion weld or an adhesive weld.

BRIEF DESCRIPTION OF THE DRAWINGS

The invention will now be described in greater detail by reference to the drawings, in which.

DESCRIPTION OF THE PREFERRED EMBODIMENTS

Figures 1, 2, 3:
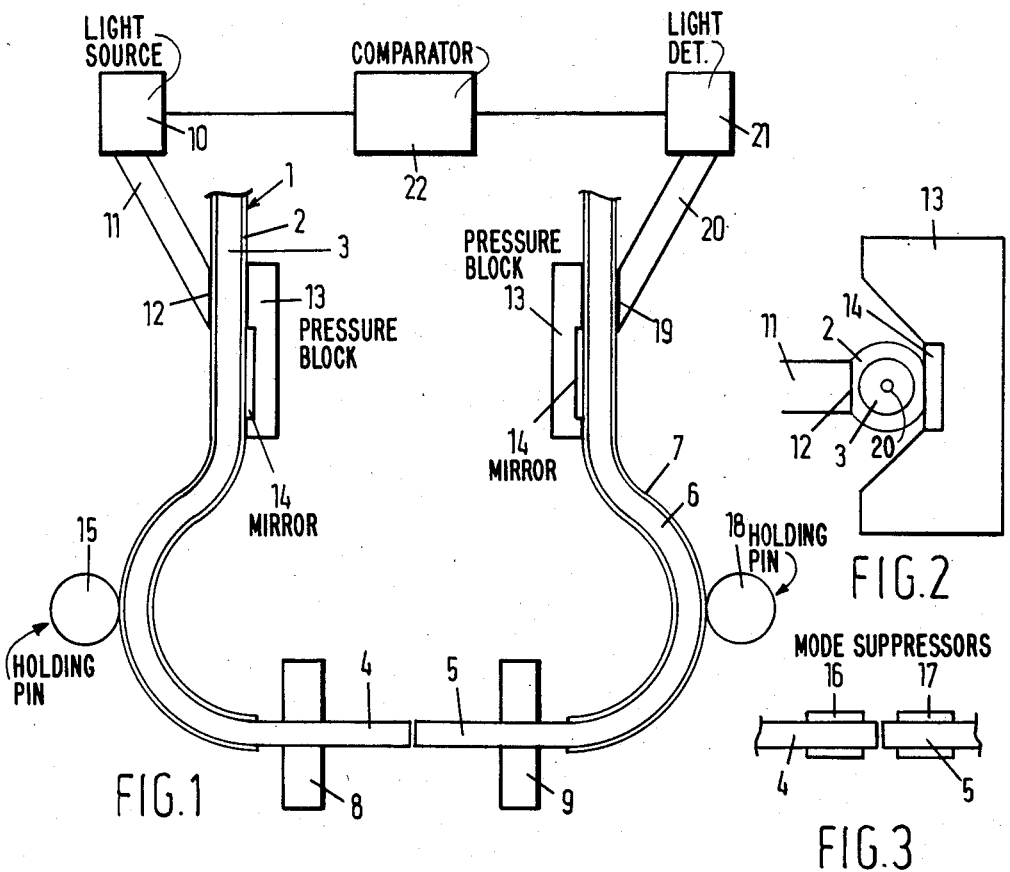
FIG. 1 shows schematically a preferred form of construction of an apparatus constructed in accordance with the invention.
FIG. 2 shows an injection and withdrawal point in cross section.
FIG. 3 provides a view of a further form of two fiber ends that are to be coupled.

FIG. 1 illustrates a preferred form of construction of an apparatus constructed in accordance with the invention, wherein a first optical fiber 1 includes a buffer 2 which surrounds a cladding 3 which surrounds a core, 20. The numeral 4 designates the end of the fiber 1 that is to be spliced, this end being stripped of its buffer over a distance of preferably 20 mm. If the refractive index of the buffer is higher than that of the cladding, the removal of the buffer can be limited to as little as 1 or 2 mm that has to be removed prior to fusion welding or adhesive joining. An end 3 of a second optical fiber having a cladding 6 is likewise be stripped of its buffer 7 over a distance of 20 mm. The first fiber end 4 is clamped in a fixed block 8, and the second fiber end 5 is clamped in a displaceable block 9. By means of the displaceable block 9, the second fiber end can be displaced through a few thousandths of a meter in a plane at right angles of the axis of the second fiber.

According to the invention and with the aid of a strong light source 10, such as a laser, a signal, modulated if preferred, is radiated or injected into the buffer 2 by way of a light conductor 11, which can be an optical fiber if desired. The light conductor 11 preferably has a hard ground surface 12, the refractive index of which is preferably, but not necessarily, the same as or lower than that of the buffer 2. The light conductor 11 is preferably made of quartz and contacts an outer protective layer of the fiber. In the embodiment shown, the light conductor 11 contacts the fiber buffer, though the light conductor alternatively could contact a protective layer which surrounds the protective buffer or other protective layer therearound, as long as these protective layers are sufficiently transparent.

FIG. 2 shows a cross section through a light signal point. A pressure-applying block 13 is provided opposite the surface 12, part of which block is provided with a mirror 14. The mirror 14 prevents a considerable part of the injected light from emerging out of the fiber at the side opposite the light conductor 11.

If the buffer has a higher refractive index than the cladding, the injected optical signal will enter the cladding at an angle of incidence smaller than would occur if the index of refraction of the buffer were lower than the cladding (e.g., a more perpendicular angle). This runs counter to the requirement whereby the signal has to remain in the cladding. An optical signal that forms too small an angle of incidence cannot remain within the cladding. When the cladding modes are attempted to be converted into modes conducted through the core, a similar problem arises. The core has a slightly higher refrative index (e.g., about 1.464) than the cladding (e.g., about 1.460) so that the cladding modes pass into the core at a smaller angle relative to the perpendicular than is desired.

According to the invention, the fiber 1 is bent through an angle, preferably between 60° and 180°, most preferably 90°, over a radius preferably between 3 mm and 10 mm, most preferably 5 mm. A pin 15 is provided in front of the bend and preferably has a reflecting surface. The pin is preferably chromium-plated. It will be seen that in a fiber bent in this way, the major part of the cladding and/or buffer modes present in the fiber are converted into modes conducted through the core, provided that the bend is formed at a maximum distance of 10 mm after the light injection point.

For the purpose of further supressing any cladding signal that may remain, the ends 4 and 5 of the fibers can be provided, just in front of the weld, with two cylindrical layers 16 and 17 made of a material having a higher refractive index than that of the cladding (FIG. 3). The layers 16 and 17 are preferably formed by a suitable type of glue or sponge material comprising silicone oil. It is also possible to provide the blocks 8 and 9 on the inside with a suitable plastics material having a higher refractive index than that of the jacket. When these measures are taken, the optical signal in the end of the optical fiber will occur almost exclusively in the core. Then, by means of the block 9, the core at the fiber end 5 is so placed that a maximum amount of the light radiated through the core at the fiber end 4 is passed into the core of the fiber end 5.

By bending the second fiber, with the aid of a second pin 18, through an angle preferably between 60° and 180°, most preferably 90°, the core light is withdrawn through a surface 19 and passed into a light conductor 20 which preferably has a slightly greater diameter than the fiber and preferably a slighly higher refractive index than the fiber buffer 7 or outermost fiber protective layer it contacts. The optical signal is then passed to a detector 21. In a manner which can be assumed to be known, the detected electrical signal is compared, by means of the comparator 22, with the signal generated by the laser 10. The fiber ends 4, 5 are moved relative to one another using feedback control to maximize the detected signal, at which point the ends 4, 5 are spliced by fusion or gluing for example.

Figure 4:
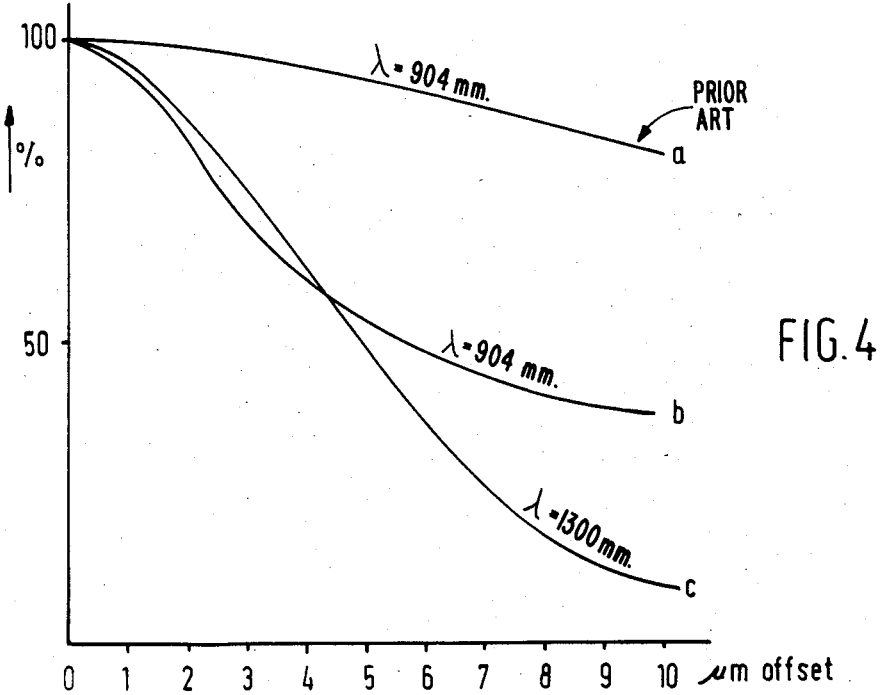
FIG. 4 is a graph showing the relationship between amount of light and fiber core offset.

FIG. 4 shows the effect of the measures in accordance with the invention. In the graph, the optical signal detected by the detector 21 is shown as a percentage along the vertical axis, and the offset of the middle lines of the cores of the fiber ends 4 and 5 is shown in $\mu m$ along the horizontal axis. It will be seen from the graph that a relatively large offset (1 $\mu m$) leads to only a very slight difference in signal (curve a) when the measures proposed by the invention are not taken. Curve b, which is plotted from the results of measurements carried out at the same wavelengths but after the steps proposed by the invention have been taken, shows that the alignment of the cores can take place in a much more precise manner with a much greater variation in the signal, offset remaining the same. Curves a and b are both plotted at wavelength of 904 nm. Curve c is plotted for equipment in accordance with the invention with an optical signal having a wavelength of 1300 nm.

Finally, the novel light injection and light withdrawal means of the invention are usable independently in applications other than splicing where a desire exists to inject and/or withdraw light into/from an optical fiber without terminating the fiber, one such application being local area networks, for example. Accordingly, though the invention has been described by reference to an embodiment for splicing, it should be understood that the invention is not to be limited by such reference, and is only to be limited by the appended claims.

What is claimed is:

1. An apparatus for injecting light into a mono-mode optical fiber, which fiber comprises a core (20) surrounded by a plurality of circumferential portions, including a first circumferential portion closest to the core and constituted by a cladding (2) having an index of refraction lower than that of said core and a second circumferential portion which immediately surrounds said first circumferential portion and is constituted by a buffer (3), said apparatus comprising:
   light source means (21) for producing an optical signal;
   light conducting means (11) for transferring said optical signal from said light source means into said fiber, said light conducting means having
   (a) an end surface in contact with a said circumferential portion of said fiber at a straight section of said fiber, and
   (b) an index of refraction which is less than the index of refraction of said circumferential portion of said fiber with which said end surface is in contact.

2. An apparatus as claimed in claim 1, wherein said optical fiber has a near end nearer than another end of said fiber to the location at which said end surface of said light conducting means is in contact with said circumferential portion of said fiber, and wherein between said contact location and said near end of said fiber, said optical fiber is bent by bending means through an angle such that radiating light modes propagating from said contact location are converted in at least one of said circumferential portions of said fiber into modes guided through said core of said fiber.

3. An apparatus as claimed in claim 1, comprising also light reflecting means (14) disposed substantially in contact with said second circumferential portion of said fiber at said straight section thereof at a location on the opposite said side of said fiber from contact location and positioned for reflecting, back into the interior of said fiber, light passing from said light conducting means through said fiber to said reflecting means.

4. An apparatus as claimed in claim 2, comprising light reflecting means disposed substantially in contact with a said circumferential portion of said fiber at a straight section thereof at a location on the opposite side of said fiber from said contact location, said light reflecting means being positioned so as to reflect, back into the interior of said fiber, light passing from said conducting means, through said fiber to said reflecting means.

5. An apparatus as claimed in claim 1, wherein said light conducting means has a cylindrical shape having a diameter not larger than the external diameter of said fiber.

6. An apparatus as claimed in claim 2, wherein said light conducting means has a cylindrical shape having a diameter not larger than the external diameter of said fiber.

7. An apparatus as claimed in claim 1, wherein said optical fiber is bent by a bending means within a distance of 10 mm from said contact location and is bent to an angle within the range between 45° and substantially 180° over a radius between 3 and 10 mm.

8. An apparatus as claimed in claim 7, comprising light reflecting means disposed substantially in contact with a said circumferential portion of said fiber at said straight section of said fiber and in a location on the side of said fiber from opposite said contact location, said light reflecting means being positioned so as to reflect, back into said fiber, light passing from said light conducting means, through said fiber to said light reflecting means.

9. An apparatus as claimed in claim 6, wherein said light conducting means comprises a material having a hardness greater than that of said circumferential portion of said fiber where said end surface of said light conducting means is in contact with said fiber.

10. An apparatus as claimed in claim 1, wherein said light conducting means has a longitudinal axis and said end surface of said light conducting means in contact with said fiber is bevelled relative to the longitudinal axis of said light conducting means at an angle between 10° and 20°.

11. An apparatus as claimed in claim 9, wherein said optical fiber has a near end with respect to said light conducting means and is bent by bending means at a location between said near end and said contact location at an angle such that radiating modes propagating from said contact location in at least one of said circumferential portions of said fiber are converted into modes guided through said core of said fiber.

12. An apparatus as claimed in claim 11, comprising light reflecting means disposed substantially in contact with a said circumferential portion of said fiber at said straight section of said fiber at a location on the opposite side of said fiber from said contact location, said light reflecting means being positioned so as to reflect, back into said fiber, light passing from said light conducting means, through said fiber, to said light reflecting means.

13. An apparatus for withdrawing light out of a mono-mode optical fiber, which fiber comprises a core (20) surrounded by a plurality of circumferential portions including a first circumferential portion closest to the core and constituted by a cladding (2) having an index of refraction lower than that of said core and a second circumferential portion which immediately surrounds said first circumferential portion and is constituted by a buffer (3), said apparatus comprising:
   bending means for said fiber, with respect to which said fiber has a near end, for bending said fiber through an angle such that radiating modes guided through said core of said fiber and propagating from said near end thereof are converted into radiating modes occurring in at least one of said circumferential portions of said fiber and
   light conducting means having
   (a) an end surface in contact with a said circumferential portion of said fiber at a straight section thereof for outcoupling light from said radiating modes, and (b) an index of refraction larger than that of said circumferential portion of said fiber with which said light conducting means is in contact.

14. An apparatus as claimed in claim 13, wherein said bending means is constructed so as to bend said fiber through an angle between 60 and substantially 180°.

15. An apparatus as claimed in claim 13, wherein said light conducting means has a generally cylindrical shape and has a diameter larger than that of said fiber.

16. An apparatus as claimed in claim 14, wherein said light conducting means has a generally cylindrical shape and has a diameter larger than that of said fiber.

17. An apparatus for aligning first and second monomode optical fibers wherein each of said fibers includes a core surrounded by a plurality of circumferential portions including a first circumferential portion closest to the core and constituted by a cladding having an index of refraction lower than that of said core and a second circumferential portion which immediately surrounds said first circumferential portion and is constituted by a buffer (13), said apparatus comprising;

light source means for producing an optical signal;

first light conducting means for transferring said optical signal from said light source means into said first fiber, said first light conducting means having a bevelled end surface in contact with a circumferential portion of said first fiber at a straight section thereof and an index of refraction that is less than the index of refraction of said circumferential portion of said first fiber with which it is in contact;

first bending means for bending said first fiber through such an angle such that radiating modes propagating from said bevelled end surface in contact with a said circumferential portion of said first fiber through at least one said circumferential portion of said fiber and towards a near end of said fiber, are converted into modes guided through said core of said first fiber towards said near end thereof;

second bending means for bending said second fiber through an angle such that modes guides through said core of said second fiber from a near end thereof adjacent to said near end of said first fiber and facing opposite thereto are converted into radiating modes propagating in at least one of said circumferential portions of said second fiber;

second light conducting means having;

(a) a bevelled end surface in contact with a said circumferential portion of said second fiber at a straight section thereof for outcoupling light of said radiating modes, and (b) an index of refration larger than that of said circumferential portion of said second fiber with which said second light conducting means is in contact, and means for moving said ends of said first and second fibers relative to one another in response to light coupled out of said second light conducting means so as to maximize the amount of outcoupled light.

18. An apparatus as claimed in claim 17, comprising first light reflecting means disposed in contact with a straight section of said first fiber at a location on the opposite side of said fiber from the location at which said bevelled end surface of said first light conducting means is in contact with said first fiber, said light reflecting means being positioned so as to reflect light back into said first fiber after passing from said light conducting means through said first fiber to said reflecting means.

* * * * *

UNITED STATES PATENT AND TRADEMARK OFFICE
CERTIFICATE OF CORRECTION

PATENT NO. : 4,645,923

DATED : February 24, 1987

INVENTOR(S) : Cornelis M. De Blok and Pieter Matthijsse

It is certified that error appears in the above-identified patent and that said Letters Patent is hereby corrected as shown below:

IN THE TITLE:

Replace "METHOD AND DEVICE" with --APPARATUS--, both on the cover page in item [54] and at the head of column 1.

In item [75] on the cover page, delete both the truncated postal codes "AK" and "Ab" respectively following the names of the inventors.

In item [73] replace "Telegrafte" with --Telegrafie--.

Column 1, line 7, cancel "a method and";

lines 36 and 37, replace "In order to keep" with --Since--;

line 38, after "diameter" insert --is--; same line, replace "is arranged" with --lies--;

line 63, replace "EP30-106" with --EP30-108--.

Column 2, line 24, cancel "a method and";

line 30 and also in lines 31 and 32-33, cancel "and methods";

line 34, before "the invention" insert --practicing--.

UNITED STATES PATENT AND TRADEMARK OFFICE
CERTIFICATE OF CORRECTION

PATENT NO. : 4,645,923

DATED : February 24, 1987

INVENTOR(S) : Cornelis M. De Blok and Pieter Matthijsse

It is certified that error appears in the above-identified patent and that said Letters Patent is hereby corrected as shown below:

Column 3, line 18, replace "and" with --or--;
           line 37, replace "3" with --5--;
           line 38, cancel "be";
           line 43, replace "meter" with --millimeter--.

Column 4, line 8, replace "The" with --Therefore the--;
           line 12, replace "than is" with --as--;
           line 33, replace "jacket" with --cladding--;
           line 45, replace "slighly" with --slightly--.

Column 5, lines 45 and 46 (Claim 2), delete "are converted in line 45 and insert --are converted-- in line 46 after "fiber".

Signed and Sealed this

First Day of September, 1987

Attest:

DONALD J. QUIGG

Attesting Officer

Commissioner of Patents and Trademarks